3,213,106
PROCESS OF RACEMIZING OPTICALLY ACTIVE ALPHA ACIDS

Ichiro Sasaji, Kanagawa-ken, Minoru Hara, Tokyo, Susumu Tatsumi, Kenji Seki, and Takekazu Akashi, Kanagawa-ken, and Ko Ohno, Tokyo, Japan, assignors to Ajinomoto Co., Inc., Tokyo, Japan, a corporation of Japan
No Drawing. Filed Nov. 13, 1962, Ser. No. 237,363
Claims priority, application Japan, Nov. 16, 1961, 36/41,130; Dec. 13, 1961, 36/44,818; June 9, 1962, 37/23,969
11 Claims. (Cl. 260—319)

This invention relates to a process of racemizing optically active alpha amino acids.

Racemic DL-alpha-amino acids or their derivatives may be produced by synthesis and the racemates may then be resolved into their enantiomorphs by chemical or biological methods. Frequently only one enantiomorph is economically useful. In such cases, it is desirable to racemize the unwanted enantiomorph obtained by resolution to make it available as raw material for the resolution process. A given amount of racemic amino acid may thus be completely converted into one optical isomer by alternating resolution and racemization.

The known racemization processes are relatively costly. They either employ relatively expensive chemical reagents or relatively inexpensive chemical reagents in substantial amounts. In addition to the cost of the reagents, the separation of the desired product from the reagents consumes much labor and recovery of the racemic product is rarely complete.

We have found that optically active alpha amino acids can be readily racemized by heating their aqueous solutions to a high temperature. The rate of racemization is highest in the absence of strong acids or bases.

The rates of racemization of twelve representative alpha amino acids are listed in Table I together with the temperatures employed. Racemization rates are expressed in reciprocal hours so that a high value listed indicates a high rate or racemization. Values of racemization rates are given for solutions consisting of water and the amino acid, and for solutions which additionally contain a strong acid (HCl) and a strong base (NaOH in amounts corresponding to the molar concentration of the amino acid, and to twice that concentration.

While water alone is the prefered racemization agent, and is employed at temperatures well above its normal boiling temperatures of 100° C. for periods sufficient to racemize the amino hydrochloric acid, approximately equimolecular amounts of acid are preferably present during the racemization of optically active aspartic acid or lysine to avoid decomposition of the amino acid, and approximately equipmolecular amounts of alkali metal hydroxide are preferably used for homocysteic acid and proline. In addition to hydrochloric acid which is prefered because of its lack of toxicity in small amounts, its volatility and its low cost, other strong acids, such as sulfuric acid, phosphoric acid, oxalic acid, trichloroacetic acid and the like are also effective in equivalent amounts. Sodium hydroxide may be replaced by equivalent amounts of other strongly alkaline materials, such as sodium carbonate, ammonium hydroxide, calcium hydroxide, triethanolamine and the like, but sodium hydroxide is preferable for reasons of low cost, stability and lack of toxicity. The sodium and hydrochloride salts of all amino acids with which this invention is concerned are soluble in water. This factor further militates in favor of the use of HCl and NaOH as an addition agent during racemization.

The temperature during which racemization is performed according to our invention should not be lower than 150° C., preferably not substantially lower than 160° C., and it should be higher than 160° C. for a high rate of racemization. The upper temperature limit at which the racemization process of the invention may be performed to advantage is inherently determined by the heat resistance of the several amino acids in an aqueous medium. It is not usually substantially above 250° C.

Leucine and valine, for example, are known to be highly resistant to elevated temperatures. They may be completely racemized by heating them for several hours, if necessary, to temperatures above 200° C.

Although acids or alkaline substances, when present in the aqueous racemization mixture generally retard racemization, a lower rate of racemization may be balanced by the advantages derived from greater solubility of some amino acids in the presence of such addition agents. The amount of addition agent, however, should not exceed one mole equivalent thereof per mole of amino acid because of the unfavorable effects of larger amounts on the rate of racemization and on the stability of the amino acid.

When racemization is carried out by heating a solution of the amino acid in water alone, the racemic acid can be recovered from the solution by evaporation of the water. If an acid or a base are employed as addition agents, treatment with a suitable ion exchange agent permits separation of the racemic amino acid from the ad-

TABLE I

| Amino acid | Racemization temp., °C. | Racemization rate (hr.$^{-1}$) in the presence— | | | | |
|---|---|---|---|---|---|---|
| | | 2 HCl | 1 HCl | | 1 NaOH | 2 NaOH |
| L-alanine | 200 | | 0.67 | >2.3 | 1.44 | |
| L-leucine | 200 | | 0.31 | >2.3 | 0.46 | |
| L-valine | 200 | | 0.15 | 1.0–0.8 | 0.25 | |
| L-phenyl-alanine | 200 | | 0.15 | >2.3 | [1] 1.45 | |
| L-tryptophan | 170 | | [2] 0.15 | 0.30 | [1] 0.17 | |
| L-methionine | 170 | 0.053 | 0.11 | 0.45 | 0.19 | |
| L-aspartic acid | 170 | | 2.15 | [1] 2.3 | [1] 1.6 | 0.64 |
| L-homocysteic acid | 170 | | 0.21 | 0.21 | 0.78 | 0.39 |
| L-proline | 170 | | 0.083 | 0.30 | 1.14 | |
| L-lysine | 180 | 0.75 | >2.3 | >[2] 2.3 | | |
| L-arginine | 170 | 0.082 | 0.30 | >2.3 | >2.3 | |
| L-histidine | | 0.55 | [1] 1.29 | [1] 0.56 | [1] 0.58 | |

[1] Slight decomposition of amino acid.
[2] Minor, but significant, decomposition of amino acid.

The D-forms of the amino acids listed above are racemized in the same manner and at the same rates as the L-forms listed above, as is to be expected. The salts of the optically active alpha amino acids are racemized in the same manner as the free acids. This applies to salts of the amino acids with metals or other bases as well as to their salts with strong acids, such as the hydrohalides.

Example I

A mixture of 0.5 gram L-leucine and 10 ml. water was heated for two hours to 200° C. in a sealed tube. The contents of the tube were cooled to room temperature, causing crystals to form. The water was evaporated at reduced pressure. The residue was practically pure DL-leucine. The yield was 0.49 gram, and the specific rotation $$\alpha_D^{25} = 0.0°$$

(c.=2, 6 N HCl).

In a parallel run, 1 gram L-leucine and an equimolecular amount of hydrochloric acid diluted with water to 10 ml. were heated to 200° C. for two hours in a sealed container. The solution was then examined by optical methods and only 46 percent of the leucine originally present was found to have been racemized.

A mixture of 1 gram L-leucine, an equimolecular amount of NaOH, and water to make 10 ml. was kept at 200° C. for two hours. It was found by determination of the specific rotation that 60% of the leucine present had been racemized.

No measurable decomposition of leucine occurred in these racemization processes. The rate of racemization was substantially greater in the aqueous system free from added acid or base.

Example II

A mixture of 2.5 grams L-alanine and 10 milliliters water was kept for two hours at 200° C., and was then evaporated to dryness in a vacuum. The residue of colorless crystals obtained thereby weighed 2.3 grams, and consisted of pure DL-alanine. $\alpha_D^{25} = 0.0°$ (c.=10, 6 N HCl).

Similarly, a mixture prepared from 2.5 grams L-alanine, an equimolecular amount of hydrogen chloride, and water to make the total volume 11 milliliters was heated to 200° C. for two hours. It was established by measurement of specific rotation of the solution obtained that only 74 percent of the L-alanine had been racemized.

2.5 grams L-alanine, an equimolecular amount of sodium hydroxide, and water sufficient to make the total volume 11 milliliters were heated for two hours at 200° C. 94 percent of the alanine were found to be racemized by such treatment.

The rate of racemization of optically active alanine was greatest in an aqueous system free from added acid or base. No measurable decomposition occurred.

Example III 0.6 gram L-valine after having been kept at 200° C. for two hours in the presence of 10 milliliters water was found by measurement of specific rotation to be racemized 85 percent.

Additional 0.6 gram batches of L-valine were mixed respectively with equimolecular amounts of hydrochloric acid and sodium hydroxide, and with enough water to make the total volume 10 milliliters. After two hours at 200° C., only 18 percent of the valine in the acid solution was racemized, and only 22 percent in the alkaline solution.

No measureable decomposition of the valine occurred in the above three runs.

A further 0.6 gram batch of L-valine was mixed with 10 milliliters water and the aqueous mixture was heated to 250° C. for 15 minutes. 95 percent of the valine was found by rotation measurements to be racemized after the heat treatment. Only traces of valine were decomposed in the process.

Example IV

A mixture of 0.5 gram L-phenylalanine and 10 milliliters water was kept at 200° C. for two hours. The amino acid was completely racemized, as ascertained by optical rotation measurements, and was recovered without loss.

The same amount of L-phenylalanine, when mixed with 10 milliliters of a 1.3 percent solution of sodium hydroxide and heated for two hours to 200° C., was 95 percent racemized. Only a trace of the phenylalanine was decomposed.

Example V

Two one-gram batches of L-methionine were respectively mixed with water and with three mole equivalents of sodium hydroxide solution to make the total volume 10 milliliters in both cases. After heating for two hours at 180° C., the methionine treated with water alone was 74% racemized, whereas 92% conversion to racemate had occurred in the alkaline solution. No decomposition of methionine took place in either batch.

Example VI

One gram aspartic acid hydrochloride was heated with 10 milliliters water to 170° C. for two hours. Optical tests performed on the treated material showed a 98% conversion of the optically active material to the racemate to have taken place. No measurable decomposition of the amino acid had occurred.

Example VII 0.5 gram L-proline mixed with 10 milliliters water were kept at 170° C. for four hours. Optical analysis of the heated material showed 45 percent of the amino acid to be racemized.

When 0.5 gram L-proline were mixed with an equimolecular amount of sodium hydroxide and with a sufficient amount of water to make the total volume 10 milliliters, and the mixture was heated to 170° C. for four hours, 96 percent of the amino acid was found to be racemized.

Example VIII

An aqueous solution prepared from 3.0 grams L-homocysteic acid and 9.0 ml. water was heated to about 190° C. for four hours in a sealed tube. After the tube had been cooled to room temperature, its contents were mixed with 10 milliliters methanol. The colorless crystals precipitated were filtered from the solution, washed twice with methanol, and dried. They weighed 2.9 grams. They showed no optical rotation. $\alpha_D^{23} = 0.0°$ (2 N HCl). Chemical analysis of the crystals yielded values of C 26.21, H 4.95, and N 7.61, corresponding to the calculated values for homocysteic acid. A chromatogram developed on paper in the usual manner showed a single spot, thus indicating the absence of decomposition products.

In a parallel test run, 15 grams monosodium L-homocysteate dihydrate were dissolved in 35 milliliters water. The solution was sealed in a tube and heated to 170° C. for five hours. 5.7 grams of the solution were diluted after the heat treatment in a volumetric flask with 6 milliliters concentrated hydrochloric acid and with water to the 25 milliliter mark. The optical rotation of the diluted solution was found to be $\alpha_D^{23} = 0.08°$. It was calculated from this measurement that 96 percent of the optically active salt had been racemized. The heated solution was colorless, and there was no decomposition of the organic material.

Example IX

A solution was prepared from 15.0 grams L-lysine monohydrochloride dihydrate and 100 milliliters water. The solution was heated to 170° C. for 4.5 hours, and was then evaporated to dryness at 70° C. The crystalline residue was washed with a small amount of ethanol and dried. The purified crystals obtained weighed 12.1 grams corresponding to a yield of anhydrous DL-lysine monohydrochloride of 96.8 percent. Their melting point was 260° C., and the specific rotation $\alpha_D{}^{23}=0.00°$ (c.=4, $H_2O$). Analysis had the following results.

| Calculated for | C | H | N |
|---|---|---|---|
| $C_6H_{12}N_2O_2.HCl$ | 39.37 | 8.34 | 15.41 |
| Found | 39.45 | 8.28 | 15.34 |

A paper chromatogram of the crystalline material developed with a solvent mixture of two parts by volume n-butanol, two parts methanol, one part water gave a single spot in agreement with that produced with a fully identified sample of DL-lysine monohydrochlride.

In a parallel run, 100 grams of an aqueous solution containing 14.6 grams L-lysine as the only solute were heated to 200° C. for one hour. After cooling, 25 grams of 35% aqueous hydrochloric acid were added. Brown impurities precipitated from the solution were filtered off. The filtrate was evaporated to dryness, and the solid residue was recrystallized from a small amount of a 1:4 water-ethanol mixture. The crystals so obtained weighed 14.8 grams, had a melting point of 185° C., and a specific rotation $\alpha_D{}^{23}=0.00°$ (c.=4, $H_2O$). They were identified as DL-lysine dihydrochloride by means of elementary analysis and paper chromatography.

It should be understood, of course, that the foregoing disclosure relates to only preferred embodiments of the invention and that it is intended to cover all changes and modifications of the examples of the invention herein chosen for the purpose of the disclosure which do not constitute departures from the spirit and scope of the invention as set forth in the appended claims.

What is claimed is:

1. A process of racemizing an optically active amino acid compound selected from the group consisting of the amino acids alanine, leucine, valine, phenylalanine, tryptophan, methionine, aspartic acid, homocysteic acid, and proline, and the salts of said amino acids with inorganic bases and strong acids in a ratio of no more than one mol equivalent of said inorganic bases and strong acids per mol of said amino acid, which comprises heating said compound in water free from strong bases and strong acids to a temperature between 150° and 250° C., and lower than the decomposition temperature of said compound in said water until said compound is at least partly racemized.

2. A process as set forth in claim 1, wherein said amino acid is alanine.

3. A process as set forth in claim 1, wherein said amino acid is leucine.

4. A process as set forth in claim 1, wherein said amino acid is valine.

5. A process as set forth in claim 1, wherein said amino acid is phenylalanine.

6. A process as set forth in claim 1, wherein said amino acid is tryptophan.

7. A process as set forth in claim 1, wherein said amino acid is methionine.

8. A process as set forth in claim 1, wherein said amino acid is proline.

9. A process as set forth in claim 1, wherein said amino acid compound is aspartic acid.

10. A process as set forth in claim 1, wherein said amino acid compound is homocysteic acid.

11. A process as set forth in claim 1, wherein said compound is the D-isomer of said amino acid compound.

References Cited by the Examiner

UNITED STATES PATENTS 2,586,154    2/52    Emmick _____ 260—534

OTHER REFERENCES

Gilman: Organic Chemistry, volume 1, pages 176–187 (1938).

Greenstein et al.: Chemistry of Amino Acids, volume 3, pages 1837, 1853, 1876, 1924, 1951, 1993, 2121, 2234 and 2344.

Greenstein et al.: Chem. of Amino Acids, vol. 3, John Wiley and Sons, Inc., New York, 1961, pages 2255–2256.

Kameta: Yakugaku Zasshi, volume 80, 707–8 (1960).

IRVING MARCUS, *Primary Examiner.*